US008695757B2

(12) United States Patent
Duval et al.

(10) Patent No.: US 8,695,757 B2
(45) Date of Patent: Apr. 15, 2014

(54) SOUNDPROOFING ASSEMBLY FOR AN AUTOMOBILE, AND ASSOCIATED WALL ELEMENT

(75) Inventors: Arnaud Duval, Charleville-Mezieres (FR); Lars Bischoff, Braunschweig (GE); Jean-Francois Rondeau, Carignan (FR)

(73) Assignee: Faurecia Automotive Industrie, Nanterre (FR)

( * ) Notice: Subject to any disclaimer, the term of this patent is extended or adjusted under 35 U.S.C. 154(b) by 0 days.

(21) Appl. No.: 13/202,412

(22) PCT Filed: Feb. 19, 2010

(86) PCT No.: PCT/FR2010/050289
§ 371 (c)(1),
(2), (4) Date: Oct. 31, 2011

(87) PCT Pub. No.: WO2010/094897
PCT Pub. Date: Aug. 26, 2010

(65) Prior Publication Data
US 2012/0037447 A1    Feb. 16, 2012

(30) Foreign Application Priority Data
Feb. 20, 2009  (FR) ...................................... 09 51114

(51) Int. Cl.
*E04B 1/84*  (2006.01)
*E04B 1/82*  (2006.01)

(52) U.S. Cl.
USPC .......................................... 181/290; 181/286

(58) Field of Classification Search
USPC ................. 181/290, 294, 286, 204; 296/39.3
See application file for complete search history.

(56) References Cited

U.S. PATENT DOCUMENTS

| 4,488,619 A | * | 12/1984 | O'Neill ......................... 181/290 |
| 5,094,318 A | * | 3/1992 | Maeda et al. ................. 181/290 |
| 5,153,388 A | * | 10/1992 | Wittenmayer et al. ........ 181/290 |
| 5,186,996 A | * | 2/1993 | Alts ............................... 428/72 |
| 5,258,585 A | * | 11/1993 | Juriga ........................... 181/286 |
| 5,493,081 A | * | 2/1996 | Manigold ..................... 181/286 |
| 5,536,556 A | * | 7/1996 | Juriga ........................... 428/138 |

(Continued)

FOREIGN PATENT DOCUMENTS

| EP | 1428656 A | 6/2004 | |
| EP | 1902904 A1 | * 3/2008 | ............. B60R 13/08 |

(Continued)

OTHER PUBLICATIONS

International Search Report and Written Opinion issued for International Application No. PCT/FR2010/050289, Oct. 2009.

*Primary Examiner* — Edgardo San Martin
(74) *Attorney, Agent, or Firm* — Knobbe Martens Olson & Bear LLP

(57) ABSTRACT

The assembly comprises a base spring layer made with a base of a resilient porous material, and the base spring layer being intended to be placed opposite a surface of the automobile. It comprises a stiffening layer arranged above the base spring layer and having a surface density greater than 250 g/m² and at least one resilient porous upper layer arranged on the stiffening layer. The stiffening layer is made with a base of a dense porous material having a resistance to air flow strictly greater than 2000 N·m⁻³·s. The assembly advantageously has an upper resistive layer.

17 Claims, 8 Drawing Sheets

(56) References Cited

U.S. PATENT DOCUMENTS

| | | | |
|---|---|---|---|
| 5,709,925 A * | 1/1998 | Spengler et al. | 428/198 |
| 6,145,617 A * | 11/2000 | Alts | 181/290 |
| 6,524,691 B2 * | 2/2003 | Sugawara et al. | 428/292.4 |
| 6,676,199 B2 * | 1/2004 | Buisson et al. | 296/193.07 |
| 6,789,646 B2 * | 9/2004 | Wang et al. | 181/293 |
| 7,201,253 B2 * | 4/2007 | Duval et al. | 181/204 |
| 7,318,498 B2 * | 1/2008 | Woodman et al. | 181/290 |
| 7,591,346 B2 * | 9/2009 | Thompson, Jr. et al. | 181/291 |
| 7,690,480 B2 * | 4/2010 | Mori et al. | 181/290 |
| 7,789,197 B2 * | 9/2010 | Duval et al. | 181/290 |
| 2005/0016793 A1 * | 1/2005 | O'Regan et al. | 181/290 |
| 2006/0021823 A1 * | 2/2006 | Kohara et al. | 181/290 |
| 2006/0175126 A1 * | 8/2006 | Nakamoto et al. | 181/290 |
| 2006/0289231 A1 * | 12/2006 | Priebe et al. | 181/290 |
| 2007/0119651 A1 * | 5/2007 | Mori et al. | 181/290 |
| 2008/0001431 A1 * | 1/2008 | Thompson et al. | 296/187.01 |
| 2008/0073146 A1 * | 3/2008 | Thompson et al. | 181/291 |
| 2010/0006372 A1 * | 1/2010 | Bischoff et al. | 181/290 |

FOREIGN PATENT DOCUMENTS

| | | | | |
|---|---|---|---|---|
| EP | 2159786 A1 * | 3/2010 | | G10K 11/168 |
| FR | 2901209 A | 11/2007 | | |
| GB | 2163388 A * | 2/1986 | | B32B 5/32 |
| WO | WO 03069596 A1 * | 8/2003 | | G10K 11/168 |
| WO | 2007006950 A | 1/2007 | | |

* cited by examiner

SOUNDPROOFING ASSEMBLY FOR AN AUTOMOBILE, AND ASSOCIATED WALL ELEMENT

RELATED APPLICATIONS

This application is a U.S. National Phase of International Application No.: PCT/FR2010/050289, filed Feb. 19, 2010, designating the U.S., and published in French as WO 2010/094897 on Aug. 26, 2010 which claims the benefit of French Patent Application No. 09 51114 filed Feb. 20, 2009.

FIELD OF THE INVENTION

The present invention relates to a soundproofing assembly for an automobile, of the type comprising:

a base spring layer made of a porous, resilient material, the base spring layer being intended to be placed opposite a surface of an automobile;

a stiffening layer arranged above the base spring layer with a surface density of more than 250 g/m$^2$;

at least one porous, resilient upper layer arranged on the stiffening layer.

Such an assembly is intended to resolve the acoustic problems that arise in a substantially closed space, such as the passenger cab of an automobile, near sources of noise such as an engine, the pneumatic contact with the road, etc.

In general, in the field of low frequencies, the sound waves created by the aforementioned noise sources undergo "damping" by materials in the form of single or double sheets (sandwich) or by a porosity and resilience effect of a mass-spring system, in particular with viscoelastic foam.

Within the meaning of the present invention, a soundproofing assembly ensures "insulation" when it prevents the entry of middle- and high-frequency sound waves in the soundproofed space, essentially by reflecting waves toward the sources of noise or outside the soundproofed space.

BACKGROUND OF THE INVENTION

A soundproofing assembly operates by "sound absorption" (in the field of middle and high frequencies) when the energy from the sound waves dissipates in an absorptive material.

Known from WO 2007/006950 is a soundproofing assembly of the aforementioned type, which comprises a base spring layer arranged on an inner surface of the automobile, and a layer of airtight heavy mass, to ensure, combined with the base spring layer, good sound insulation, through a "mass-spring" type of effect.

The soundproofing assembly described in WO 2007/006950 also comprises, above the heavy mass layer, at least one upper layer of absorbing foam that ensures good sound absorption.

Such an assembly therefore makes it possible to combine good sound insulation properties and significant sound absorption over a wide range of frequencies, while offering a substantial weight reduction relative to a traditional system of the simple "mass-spring" type.

The soundproofing assemblies described in WO 2007/006950 can satisfactorily be produced industrially, while keeping good acoustic properties, with a heavy mass layer having a minimum basis weight of about 2 kg/m$^2$.

However, given the current constraints relative to reducing the mass of automobiles, automobile builders require that soundproofing assemblies be still further lightened.

SUMMARY OF THE INVENTION

One aim of the invention is therefore to obtain an even lighter soundproofing assembly, which remains easy to manufacture while having excellent combined sound insulation and absorption properties.

To that end, the invention relates to an assembly of the aforementioned type, characterized in that the stiffening layer is made with a base of a dense porous material having a resistance to air flow between 2000 N·m$^{-3}$·s and 6000 N·m$^{-3}$·s, advantageously between 3000 N·m$^{-3}$·s and 5000 N·m$^{-3}$·s.

The assembly according to the invention can comprise one or more of the following features, considered alone or according to all technically possible combinations:

the thickness of the stiffening layer is strictly smaller than the thickness of the resilient porous upper layer and strictly smaller than the thickness of the base spring layer;

the porous material of the stiffening layer comprises a compressed felt, or a layer of recycled material.

the resistivity to the passage of air of the resilient porous upper layer is advantageously between 10000 N·m$^{-4}$·s and 140000 N·m$^{-4}$·s;

the assembly comprises at least one airtight film, having a thickness smaller than or equal to 150 µm, inserted between the stiffening layer and one and/or the other of the porous upper layer and the base spring layer;

the assembly also comprises a resistive upper layer, arranged above the porous resilient upper layer, the upper resistive layer having a resistance to air flow between 200 N·m$^{-3}$·s and 2000 N·m$^{-3}$·s;

the upper resistive layer is made with a base of a nonwoven or a compressed felt having a basis weight of less than 200 g·m$^{-2}$;

the assembly comprises a decorative layer or a protective layer arranged on the upper resistive layer, opposite the stiffening layer;

the assembly comprises a decorative layer or a protective layer applied on the resilient porous upper layer, opposite the stiffening layer;

the assembly comprises a light sealing film, with a basis weight of less than or equal to 150 g·m$^{-2}$ arranged above the resilient porous upper layer and a decorative layer or protective layer applied on the light sealing film, opposite the resilient porous upper layer;

the base spring layer, and the resilient porous upper layer are made with a felt base;

the resilient porous upper layer is made with a foam base with a tortuosity greater than 1.4;

in at least one part of the soundproofing assembly, the base spring layer is spaced apart from the stiffening layer to delimit an air blade with an average thickness greater than the average thickness of the stiffening layer; and the porous material also comprises pieces of divided solid matter.

The invention also relates to an automobile wall element, characterized in that it comprises:

a support forming a body element of the automobile delimiting a surface; and an assembly as defined above, at least part of the base spring layer being arranged spaced away from the support to delimit, between the support and the base spring layer, an air blade with an average thickness greater than the average thickness of the stiffening layer.

The invention also relates to a method for manufacturing an assembly as defined above, characterized in that it comprises the following steps:

shredding a piece of automobile equipment to form divided pieces of recycled solid material;

incorporating pieces of recycled solid material in a felt or in a porous foam to form the stiffening layer; and assembling the stiffening layer with at least one of the resilient porous upper layer and the base spring layer.

BRIEF DESCRIPTION OF THE DRAWINGS

The invention will be better understood upon reading the following description, provided solely as an example, and done in reference to the appended drawings, in which.

DETAILED DESCRIPTION OF THE EMBODIMENTS

In all of the following, the directions are generally the usual orientations of an automobile. However, the terms "above," "on," "below," "under," "upper" and "lower" extend relatively, in relation to the reference surface of the automobile, opposite which the soundproofing assembly is arranged. The term "lower" is thus understood as being situated closest to the surface and "upper" as being furthest from said surface.

Examples of soundproofing assemblies 10A to 10M according to the invention, intended to be placed opposite a surface 12 of an automobile, are shown in FIGS. 1 to 13.

Figure 10:
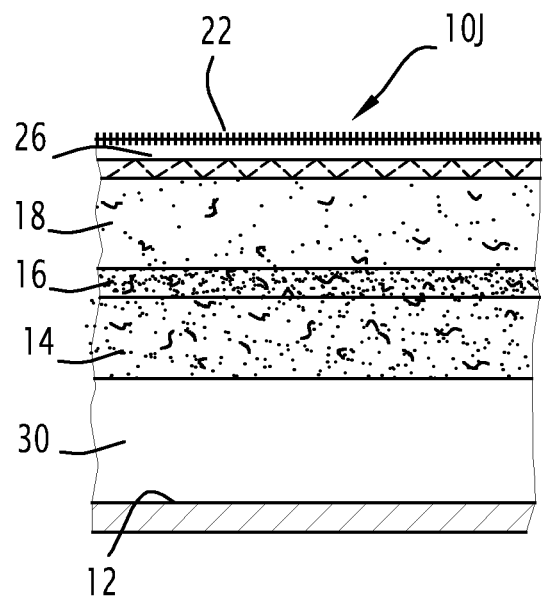
FIG. 10 is a view similar to FIG. 1 of a tenth soundproofing assembly according to the invention, arranged opposite a floor of the automobile.
Figure 11:
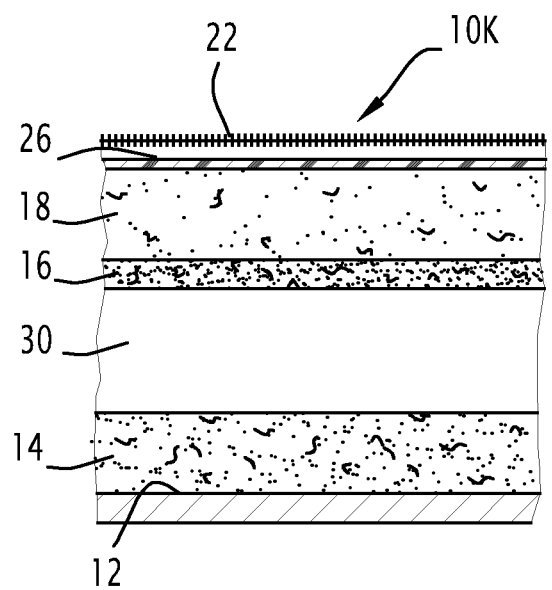
FIG. 11 is a view similar to FIG. 10 of an eleventh soundproofing assembly according to the invention.
Figure 12:
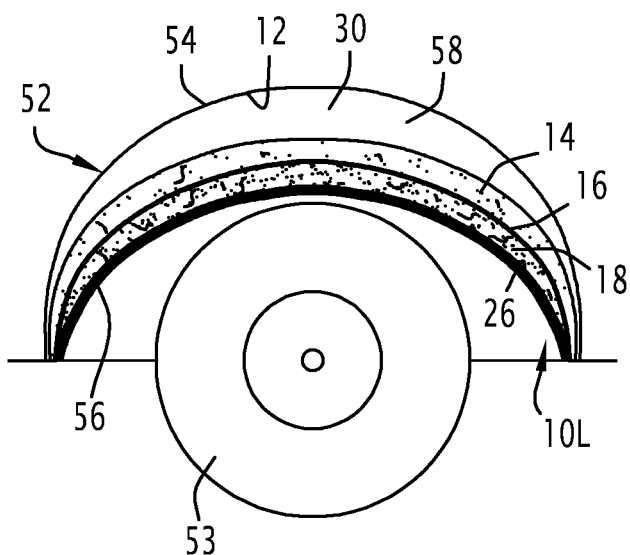
FIG. 12 is a cross-sectional view along a vertical plane of a twelfth soundproofing assembly according to the invention, arranged above a wheel passage.
Figure 13:
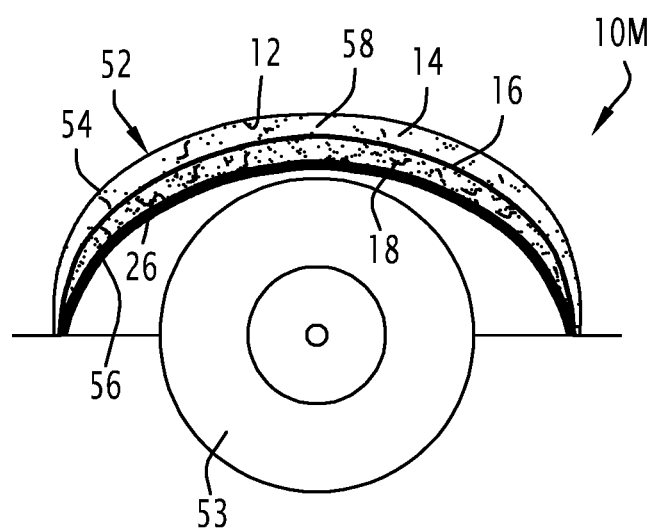
FIG. 13 is a view similar to FIG. 12 of a thirteenth soundproofing assembly according to the invention.

The surface 12, is for example, a sheet metal surface of the automobile that defines in particular a floor of the automobile, as illustrated by FIGS. 10 and 11, said floor for example being a trunk floor. Alternatively, the surface 12 defines a fire wall separating the passenger compartment from the engine compartment (FIGS. 1 to 9), a ceiling of the automobile, a door, or a front or rear wheel passage, as illustrated by FIGS. 12 and 13.

We will first describe the general structure and the properties of the different layers forming a soundproofing assembly according to the invention and then, examples of arrangements of these layers, as shown in FIGS. 1 to 13.

According to the invention, the soundproofing assembly comprises a base spring layer 14, intended to be placed opposite the surface 12, a stiffening layer 16 arranged above the base spring layer 14 and made with a base of a dense porous material, and a resilient porous upper layer 18 arranged above the stiffening layer 16.

Optionally, the soundproofing assembly also comprises a resistive upper layer 20, arranged above the resilient porous upper layer 18, and also optionally, a decorative layer 22 or a protective layer 56 placed above the layer 18, replacing the layer 20 or above it.

The base spring layer 14, combined with the stiffening layer 16, is intended to ensure good sound insulation properties.

It is, for example, made with a base of a felt, or a base or a resilient porous foam.

"Felt" within the meaning of the present invention refers to a mixture of base and binding fibers. The fibers can be noble and/or recycled fibers, natural or synthetic, of one or several natures. Examples of natural fibers that can be used are linen, cotton, hemp, bamboo, etc. Examples of synthetic fibers that can be used are glass, Kevlar, polyamide, acrylic, polyester, polypropylene fibers, these examples not being limiting.

The binder is, for example, a resin or binding fibers that have a melting point lower than that of binder-based fibers. Examples of resins are epoxy resins or phenolic resins. Examples of binding fibers are polypropylene, polyethylene, polyamide, polyester, or bicomponent polyesters, these examples not being limiting.

In one alternative, the felt of the base spring layer contains recycled material coming from waste of an internal or external origin, for example from dropped pieces of automobile equipment, manufacturing scraps, or end-of-life pieces of an automobile. This waste is, for example, shredded and incorporated into the felt in the form of pieces of divided matter formed by agglomerates, flakes or particles. The components of the waste can be separated before or during shredding.

In an alternative of the foam-based spring layer, the foam is an open-cell foam. It is, for example, made from polyurethane. The foam is injected or split.

Alternatively, the injected or split foam also contains recycled material, as defined above, or mineral loads or biopolyol.

The base spring layer 14 is porous and has a porosity adapted to have a resistivity to the passage of air advantageously between 10,000 $N \cdot m^{-4} \cdot s$ and 90 000 $N \cdot m^{-4} \cdot s$, preferably 30 000 $N \cdot m^{-4} \cdot s$.

The resistance and the resistivity to the passage of air are measured using the method described in the thesis "Mesures des paramètres caractérisant un milieu poreux. Etude expérimentale du comportement acoustique des mousses aux basses fréquences.", Michel HENRY, defended on Oct. 3, 1997 at the Université du Mans.

In the case of felt, the layer 14 has a basis weight between 200 $g/m^2$ and 2 000 $g/m^2$, advantageously between 750 $g/m^2$ and 1 400 $g/m^2$. In the case of foam, the volume mass of the layer 14 is between 30 $kg/m^3$ and 70 $kg/m^3$ and in particular about 50 $kg/m^3$.

The thickness of the base spring layer 14, taken perpendicular to the surface 12, is advantageously between 5 mm and 30 mm, and for example close to 15 mm.

To have spring properties, the base spring layer 14 advantageously has a modulus of elasticity between 100 Pa and 100,000 Pa, in particular about 8000 Pa.

According to the invention, the stiffening layer 16 is made with a base of a relatively dense porous material having a resistance to air flow strictly greater than 2000 $N \cdot m^{-3} \cdot s$.

This layer 16 is for example made with a base of a compressed felt, the felt being as defined above, or a layer of compressed recycled material.

In one alternative, the stiffening layer 16 is formed with a base of a mixture of polymer fibers, advantageously from polypropylene fibers, with glass or natural fibers.

According to the invention, a "layer of recycled material" is obtained by shredding, and/or densification and/or granulation, then stuccoing waste on a support. The recycled material comes from waste of an internal or external origin, for example made up of dropped parts, scraps, end-of-life pieces of an automobile. This waste is, for example, shredded to form pieces of divided material formed by agglomerates, flakes, or particles of waste. This waste can also be shredded and densified or shredded and transformed into granulates to form pieces of divided material made up of waste agglomerates.

The components of the waste can be separated before or during shredding. The pieces or agglomerates or granulates of waste are then deposited, for example by stuccoing on a layer of nonwoven, a layer or felt, or a film. A second layer of nonwoven, felt or film is advantageously deposited on the upper surface of the recycled material.

The layer of recycled material is then densified, and compressed for example by needlepunching, or by heating and calendaring, or by using a dual-band press with or without preheating.

The layer 16 thus has a resistance to air flow greater than 2000 $N \cdot m^{-3} \cdot s$, and advantageously below 6000 $N \cdot m^{-3} \cdot s$. Advantageously, this resistance to air flow is strictly greater than 2500 $N \cdot m^{-3} \cdot s$ and more advantageously between 3000 $N \cdot m^{-3} \cdot s$ and 5000 $N \cdot m^{-3} \cdot s$.

It has a basis weight advantageously between 250 $g/m^2$ and 2000 $g/m^2$, in particular greater than 1000 $g/m^2$, for example between 1000 $g/m^2$ and 1800 $g/m^2$. The layer 16 has a thickness strictly smaller than that of the base spring layer 14 and that of the upper layer 18, for example between 2 mm and 7 mm and advantageously substantially equal to 5 mm.

It has a Young's modulus greater than 100,000 Pa and advantageously between 100,000 Pa and $10^8$ Pa, advantageously substantially equal to $10^7$ Pa.

Despite its significant permeability relative to a sealed heavy mass, the layer 16 combined with the layers 14 and 18 surprisingly ensures good acoustic insulation, greater than that of the bi-permeable assemblies known in the state of the art.

The resilient porous upper layer 18 is intended to have good absorption properties. It has a resistivity to the passage of air between 10 000 $N \cdot m^{-4} \cdot s$ and 140 000 $N \cdot m^{-4} \cdot s$.

The thickness of the porous upper layer 18 is for example between 5 mm and 30 mm, for example equal to 15 mm.

The porous upper layer 18 for example has a base of an open-cell foam.

It is for example made from polyurethane. The foam is injected or split. Alternatively, it also contains recycled material, as defined above, or mineral filler or bio-polyol.

The volume mass of this foam is for example between 10 $kg/m^3$ and 80 $kg/m^3$, advantageously 70 $kg/m^3$.

This foam can have a high tortuosity, in particular greater than 1.4 and advantageously between 1.4 and 3, as described in application WO 2007/006950 by the Applicant.

This tortuosity is measured by determining the slope of the curve representing the variation of the square of the refraction index for the acoustic wavelength used, as a function of the opposite of the square root of the frequency.

When an injected foam is used to form the layer 18, a first fine airtight film 24A, with a basis weight of less than 150 $g/m^2$, advantageously less than 100 $g/m^2$, and with a thickness smaller than 150 μm, advantageously less than or equal to 100 μm, is advantageously inserted between the stiffening layer 16 and the resilient porous upper layer 18. This film prevents foam from penetrating the stiffening layer 16 during injection.

When an injected foam is used to form the base spring layer 14, a second fine airtight film 24B, with a basis weight smaller than 150 $g/m^2$, advantageously smaller than 100 $g/m^2$, and with a thickness of less than 150 μm, advantageously smaller than or equal to 100 μm, is inserted between the stiffening layer 16 and the base spring layer 14. This film prevents the foam from penetrating the stiffening layer 16 during injection.

Due to their small thickness, smaller than 150 μm, the fine films 24A, 24B are acoustically practically transparent.

Alternatively, the resilient porous upper layer 18 is formed by an absorbent felt. In one example, the felt comprises microfibers, such as for example more than 50%, advantageously more than 80% microfibers.

"Microfibers" refers to fibers with a size smaller than 0.9 dtex, advantageously smaller than 0.7 dtex.

In the case of a layer 18 of felt, the basis weight of the layer 18 is advantageously between 200 $g/m^2$ and 2000 $g/m^2$.

The upper resistive layer 20 is for example made with a base of a nonwoven or a material having a controlled resistance to air flow, for example a resistive nonwoven or a compressed felt with a low grammage whereof the acoustic behavior is close to that of a resistive nonwoven. It has a thickness smaller than that of the porous upper layer 18 and that of the base spring layer 14.

Its basis weight is between 20 $g/m^2$ and 200 $g/m^2$, advantageously equal to 100 $g/m^2$.

This layer 20 has a resistance to air flow that is between 200 $N \cdot m^{-3} \cdot s$ and 2000 $N \cdot m^{-3} \cdot s$, advantageously between 200 $N \cdot m^{-3} \cdot s$ and 1200 $N \cdot m^{-3} \cdot s$, in particular equal to about 1000 $N \cdot m^{-3} \cdot s$.

As will be seen below, this upper resistive layer 20 makes it possible, combined with the other layers 14, 16, 18, surprisingly to improve the absorption coefficient and the transmission loss for frequencies above about 1000 Hz.

The additional decorative layer 22 of covering or decor is arranged above the upper resistive layer 20.

In one alternative, the decorative layer 22 is arranged above the upper layer 18, replacing the resistive layer 20.

In another alternative, a sealing fine film 26 having a basis weight below 150 $g/m^2$, advantageously smaller than 100 $g/m^2$ and preferably between 30 $g/m^2$ and 70 $g/m^2$ is inserted between the upper layer 18 and the decorative layer 22, in place of the resistive layer 20.

The thickness of said film 26 is smaller than 150 μm, in particular smaller than 100 μm. Said film 26 is advantageously made from thermoplastic polymer.

The additional decorative layer 22 is then applied on the fine film 26. This film 26 is intended to ensure water-tightness in the case of a carpet or floor.

The protective layer 56 is for example made with a base of a carpet or felt, for example a flat needlepunched-type carpet or a dual-layer felt, and can have undergone processing. This layer has particular characteristics, for example hydrophobic and/or oleophobic and/or hydro-repellence and/or fluid resistance and/or gravel projection resistance properties, etc.

This protective layer 56 is arranged above the upper resistive layer 20.

In one alternative, the protective layer 56 is arranged above the upper layer 18, replacing the resistive layer 20.

In another alternative, a fine sealing film 26 having a surface mass smaller than 150 g/m$^2$, advantageously smaller than 100 g/m$^2$ and preferably between 30 g/m$^2$ and 70 g/m$^2$ is inserted between the upper layer 18 and the protective layer 56, in place of the resistive layer 20.

The thickness of this film 26 is smaller than 150 µm, in particular smaller than 100 µm. This film 26 is advantageously made from thermoplastic polymer.

The protective layer 56 is then applied on the fine film 26. This film 26 is intended to ensure water-tightness, in particular in the case of an outer wheel passage.

Examples of soundproofing assembly structures according to the invention, made with a base of layers 14 to 22, 24A, 24B and 56 as described above, will now be described in reference to FIGS. 1 to 13.

Figure 1:
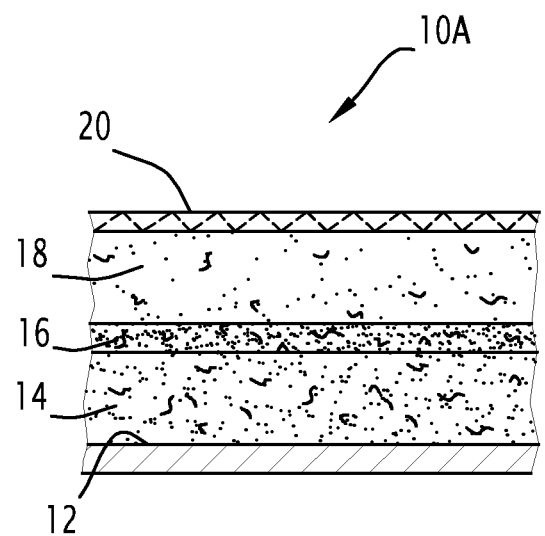
FIG. 1 is a transverse cross-sectional view of a first quadripermeable soundproofing assembly according to the invention, applied on an inner surface of an automobile formed by the fire wall.

In a first quadri-permeable soundproofing assembly 10A according to the invention, shown in FIG. 1, the base spring layer 14 is advantageously made with a base of felt or split foam, and is applied on the surface 12.

The stiffening layer 16 is advantageously made with a base of compressed felt, and is applied on the base spring layer 14, for example by adhesion.

The resilient porous upper layer 18 is advantageously made with a base of felt or split foam and is applied on the stiffening layer 16, for example by adhesion.

The assembly 10A also comprises an upper resistive layer 20 as described above, made in particular with a base of a nonwoven, assembled on the resilient porous upper layer 18.

In one particular example, which is light and inexpensive, the base spring layer 14 and the resilient porous upper layer 18 are made with a felt base.

Figure 2:
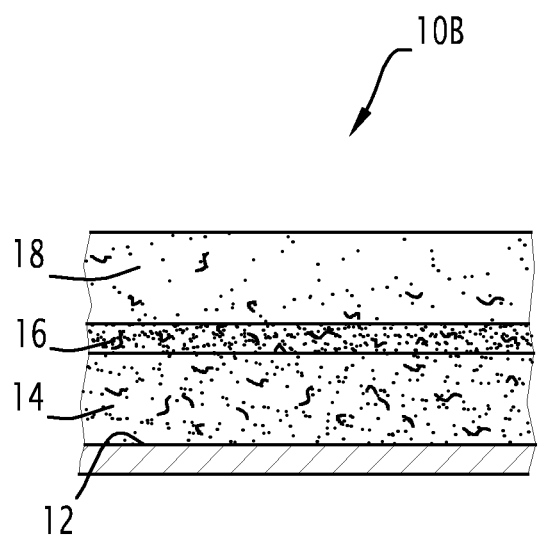
FIG. 2 is a view similar to FIG. 1 of a second soundproofing assembly according to the invention applied on the fire wall of the automobile.

The second soundproofing assembly 10B according to the invention, shown in FIG. 2, differs from the first assembly 10A in that it lacks an upper resistive layer 20 to form a tri-permeable assembly formed by three layers 14, 16, 18.

In the second soundproofing assembly 10B, the base spring layer 14 and the resilient porous upper layer 18 are made with a base of a felt or a split foam.

Figure 3:
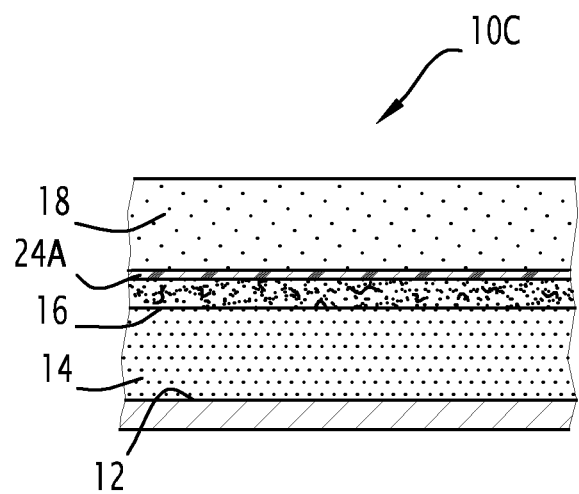
FIG. 3 is a view similar to FIG. 1 of a third soundproofing assembly according to the invention applied on the fire wall of the automobile.

The third soundproofing assembly 10C according to the invention, shown in FIG. 3, differs from the second assembly 10B in that the resilient porous upper layer 18 is formed by an injected foam, advantageously with a high tortuosity, as defined above.

In this example, a first light film 24A as described above is inserted between the resilient porous upper layer 18 and the stiffening layer 16.

In one alternative of this example, the elastic porous upper layer 18 is made from felt or split foam as in the second assembly 10B, but the film 24A remains inserted between the elastic porous upper layer 18 and the stiffening layer 16.

Figure 4:
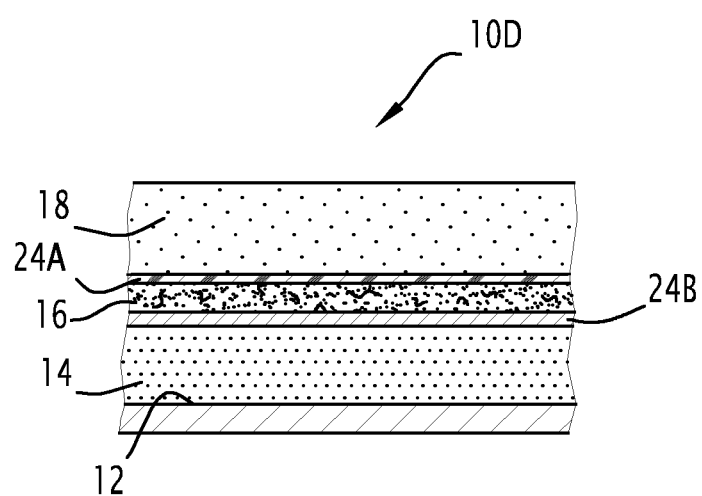
FIG. 4 is a view similar to FIG. 1 of a fourth soundproofing assembly according to the invention applied on the fire wall of the automobile.

A fourth soundproofing assembly 10D according to the invention is shown in FIG. 4. This fourth assembly 10D differs from the third assembly 10C in that a second light film 24B is inserted between the base spring layer 14 and the stiffening layer 16.

The base spring layer 14 is formed by an injected foam as defined above. Alternatively, the layer 14 is made from felt as in the second assembly 10B, but the second film 24B remains inserted between the base spring layer 14 and the stiffening layer 16.

The assemblies 10A to 10D are advantageously arranged on the fire wall of the vehicle, separating the passenger compartment from the engine compartment, on the passenger compartment side.

Figure 5:
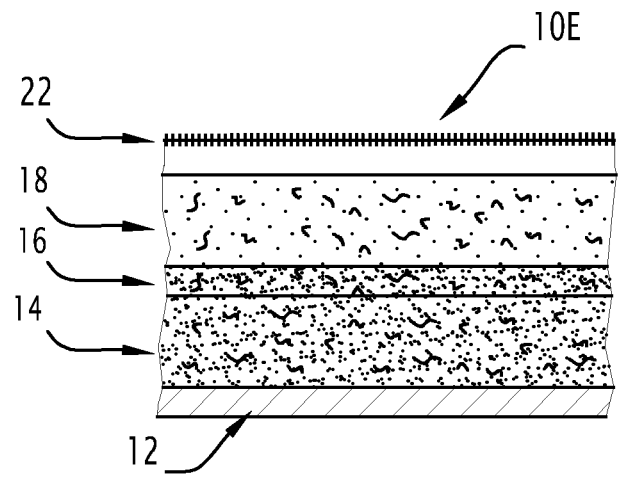
FIG. 5 is a view similar to FIG. 1 of a fifth soundproofing assembly according to the invention forming a carpet of the vehicle.
Figure 6:
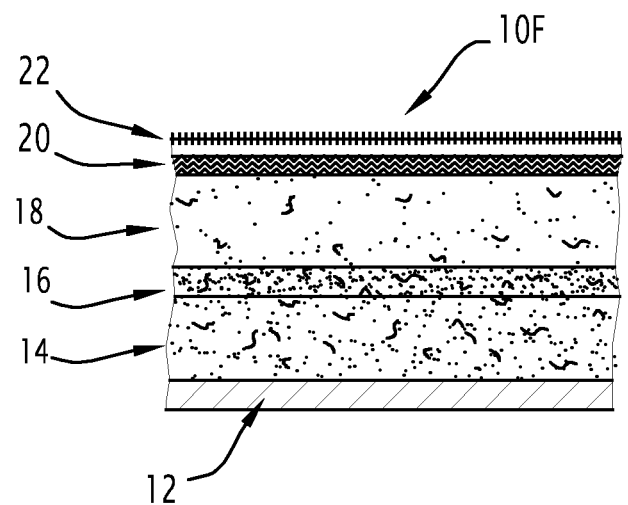
FIG. 6 is a view similar to FIG. 1 of a sixth soundproofing assembly according to the invention forming a carpet of the vehicle.

A fifth soundproofing assembly 10E according to the invention, shown in FIG. 5, differs from the first assembly 10A by the presence of an additional decorative layer 22, as described above, which replaces the resistive layer 20.

The sixth soundproofing assembly 10F according to the invention differs from the first assembly 10A by the presence of an additional decorative layer 22, as described above, which is applied on the resistive layer 20, opposite the resilient porous upper layer 18.

Figure 7:
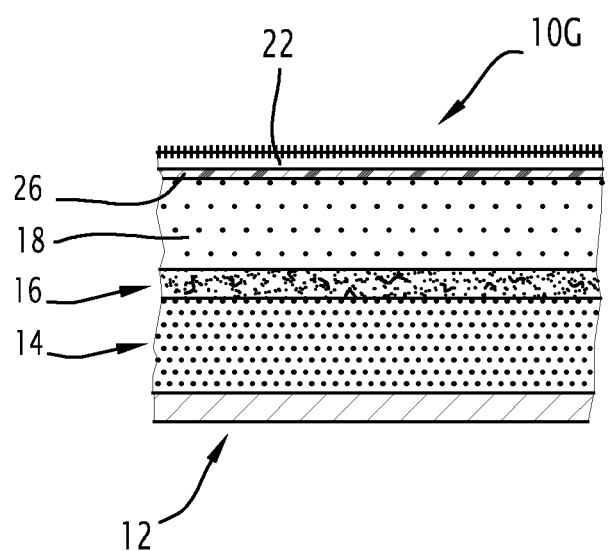
FIG. 7 is a view similar to FIG. 1 of a seventh soundproofing assembly according to the invention forming a carpet of the vehicle.
Figure 8:
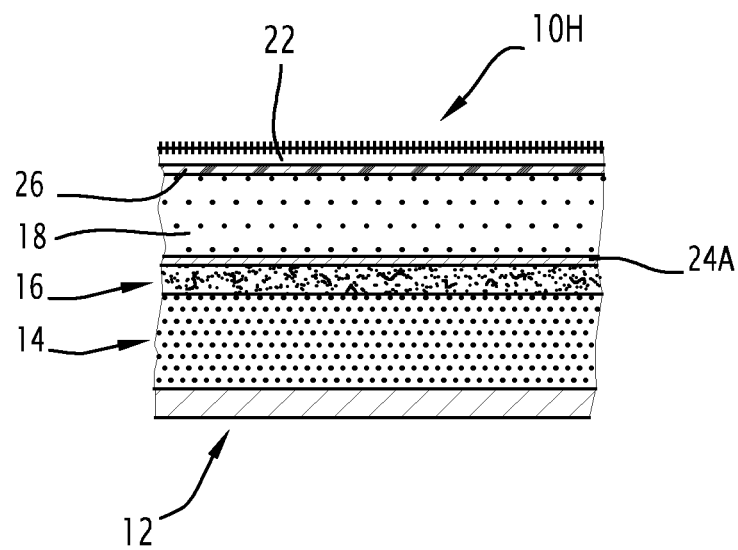
FIG. 8 is a view similar to FIG. 1 of an eighth soundproofing assembly according to the invention forming a carpet of the vehicle.
Figure 9:
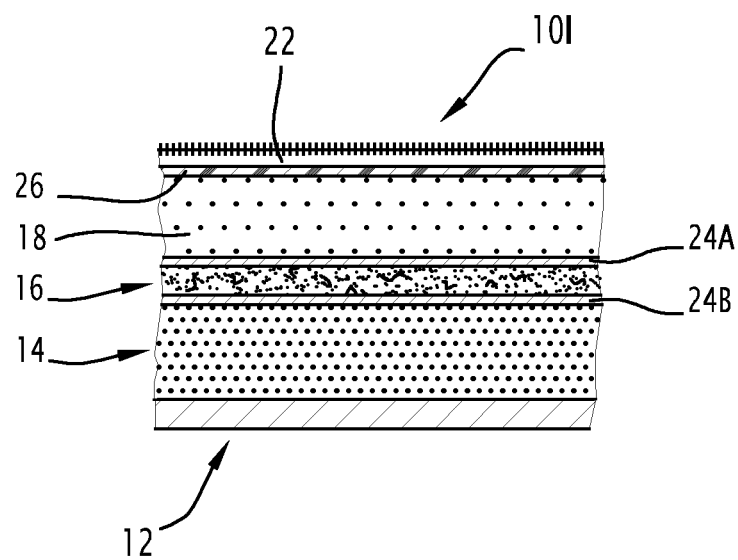
FIG. 9 is a view similar to FIG. 1 of a ninth soundproofing assembly according to the invention forming a carpet of the vehicle.

The seventh soundproofing assembly 10G according to the invention, shown in FIG. 7, differs from the fifth assembly 10E in that a light film 26 with a basis weight lower than 150 g/m$^2$ as described above, is arranged between the additional décor layer 22 and the resilient porous upper layer 18.

The eighth soundproofing assembly 10H according to the invention differs from the third assembly 10C in that it comprises, like the seventh assembly 10G, an additional layer of décor 22, a light film 26 with a basis weight of less than 150 g/m$^2$ as described above, arranged between the additional layer of décor 22 and the resilient porous upper layer 18.

Alternatively, a resistive layer 20 as described above is inserted between the additional layer of décor 22 and the resilient porous upper layer 18, replacing the film 26. In another alternative, the additional layer of décor 22 is applied on the resilient porous upper layer 18, without a film 26 being inserted between the layers 22 and 18.

The ninth soundproofing assembly 10I according to the invention differs from the fourth assembly 10D in that it comprises, like the seventh assembly 10G, an additional layer of décor 22, and a light film 26 with a basis weight of less than 150 g/m$^2$ as described above, arranged between the additional layer of décor 22 and the resilient porous upper layer 18.

Alternatively, a resistive layer 20 as described above is inserted between the additional layer of décor 22 and the resilient porous upper layer 18, replacing the film 26. In another alternative, the additional layer of décor 22 is applied on the resilient porous upper layer 18, without a film 26 being inserted between the layers 22 and 18.

Assemblies 10E to 10I are advantageously arranged on the floor of the vehicle to form a carpet.

The tenth soundproofing assembly 10J according to the invention differs from the sixth assembly 10F in that the base spring layer 14 is at least partially arranged spaced away from the surface 12 of the automobile to delimit, with said surface 12, an air blade 30 with a thickness greater than the average thickness of the stiffening layer 16.

In this example, the surface 12 is for example the bottom of a cavity formed in the floor in sheet metal of an automobile. The assembly 10J is for example fastened on the floor of the automobile at least around the cavity.

This alternative also applies to the assemblies 10A to 10I that can be arranged away from the surface 12.

The eleventh assembly 10K according to the invention differs from the seventh assembly 10G in that the base spring layer 14 is applied on the surface 12 at the bottom of the floor and in that the base spring layer 14 is situated spaced away at least locally from the stiffening layer 16 to delimit the air blade 30 with an average thickness greater than the average thickness of the stiffening layer 16.

This alternative also applies to assemblies 10E, 10F, 10H 10I in which the base spring layer 14 can be arranged spaced away from the stiffening layer 16 to delimit an air blade 30 with an average thickness greater than the average thickness of the stiffening layer 16.

The twelfth assembly 10L according to the invention is illustrated by FIG. 12. This twelfth assembly 10L is intended to be placed for example in a passage 52 of a front wheel 53 of an automobile.

This wheel passage 52 comprises an upper metal sheet 54 substantially in the shape of a half-cylinder with a transverse horizontal axis, secured to the body of the automobile, and a lower protection layer 56, as defined above. The protective layer 56 is fastened under the sheet 54 and defines, with said sheet 54, an intermediate space 58 with a vertical section in the shape of a crescent.

The sheet 54 defines, opposite the protective layer 56, the surface 12 of the automobile opposite which the soundproofing assembly 10L is placed.

The twelfth assembly 10L can be formed by one of assemblies 10E to 10I described above, with the layer of décor 22 being replaced by the protective layer 56, as described above. In the example shown in FIG. 12, the assembly 10L is formed by the assembly 10G described above, in which the layer of décor 22 has been replaced by the protective layer 56.

Assembly 10L is oriented from top to bottom with the base spring layer 14 arranged opposite the surface 12, partially spaced away from said surface 12 to define an air blade 30 in the inner space 58, and from top to bottom in FIG. 12, the stiffening layer 16 applied under the base spring layer 14, then the upper resilient porous layer 18 and a film 26.

The thirteenth assembly 10M according to the invention, illustrated by FIG. 13, is for example arranged in a passage 52 for a rear wheel 53. This assembly 10M fills substantially all of the inner space 58, so that the base spring layer 14 is applied against the surface 12 over substantially its entire surface. It is otherwise similar to the twelfth assembly 10L.

The tri-permeable or quadri-permeable soundproofing assemblies according to the invention, which do not comprise a sealing heavy mass, are therefore very light, with a total basis weight that can be less than 3,000 g/m², while maintaining both excellent absorption, with an absorption coefficient that can reach 0.9 on a very side frequency range, and very satisfactory insulation, owing to the very high resistance to air flow of the stiffening layer 16.

The additional presence of an upper resistive layer 20 surprisingly further increases the absorption offered by the quadri-permeable soundproofing assembly 10A in the range between 500 Hz and 6000 Hz.

Figure 14:
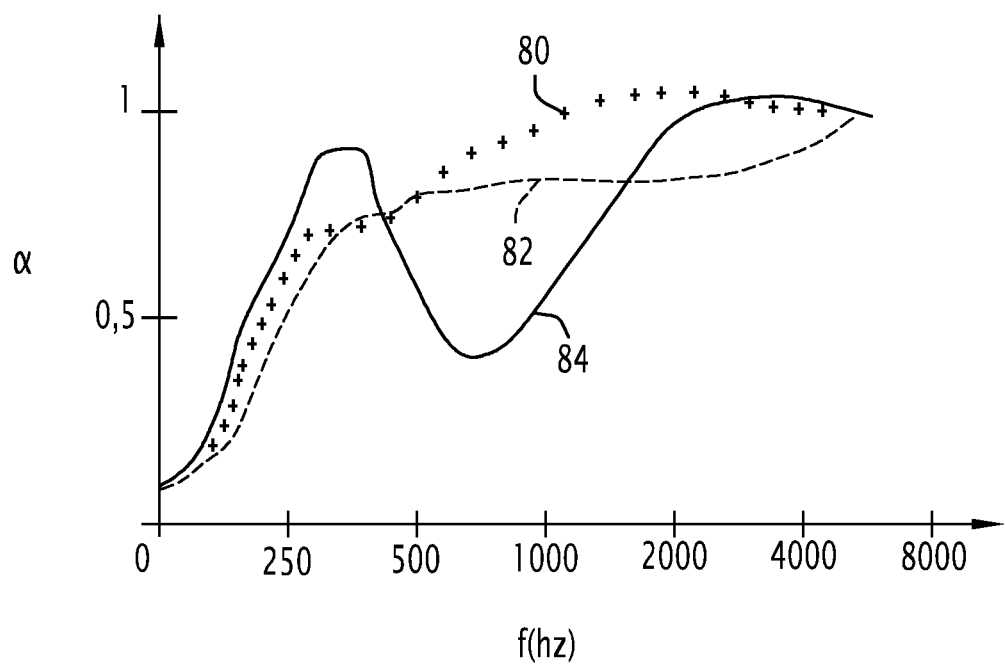
FIG. 14 is a graph illustrating the curves of the absorption coefficient in diffuse fields as a function of the frequency for two absorption assemblies according to the invention and for an absorption assembly of the state of the art.

As an illustration, simulations of the absorption coefficient α as a function of the frequency of a quadri-permeable assembly 10A according to the invention, as shown in FIG. 1 (curve 80), of a tri-permeable assembly 10B according to the invention, provided without an upper resistive layer 20 (curve 82), and a quadri-layer assembly of the state of the art having a sealing heavy mass (curve 84) are shown in FIG. 14.

In this example, the base spring layer 14 of the quadri-permeable assembly 10A and the tri-permeable assembly according to the invention is made with a base of a felt with a basis weight equal to 750 g/m² and a thickness of 13 mm. The stiffening layer 16 of these assemblies is made up of a compressed felt with a basis weight equal to 1400 g/m² and a thickness equal to 5 mm having a resistance to air flow equal to about 3500 N·m$^{-3}$·s.

The resilient porous upper layer 18 is made with a base of a felt with a basis weight equal to 400 g/m² and a thickness equal to 7 mm. In the case of the quadri-permeable assembly 10A, the resistive layer 20 is made with a base of a nonwoven having a resistance to air flow equal to about 1000 N·m$^{-3}$·s.

The insulating assembly of the state of the art is made with a base of a felt base spring layer, a basis weight equal to 950 g/m² and a thickness equal to 16.5 mm, with a sealing heavy mass layer with a basis weight equal to 1 kg/m², a resilient porous upper layer, a thickness equal to 8 mm and with a basis weight equal to 465 g/m².

Curves 80, 82 respectively correspond to the quadri-permeable assembly 10A and the tri-permeable assembly according to the invention 10B show a significant improvement of the absorption coefficient, in particular in the frequency range between 500 Hz and 2000 Hz, relative to the assembly of the state of the art, illustrated by curve 84.

Moreover, the quadri-permeable assembly 10A (curve 80) has, in particular in the frequency range between 500 Hz and 5000 Hz, an absorption greater than that of the tri-permeable assembly 10B (curve 82).

As seen in the example mentioned above, the resistance to air flow of the stiffening layer 16 is advantageously between 3500 N·m$^{-3}$·s and 4500 N·m$^{-3}$·s, in particular substantially equal to 4000 N·m$^{-3}$·s.

The resistance to air flow of the resilient porous upper layer 18 is advantageously between 20000 N·m$^{-4}$·s and 60000 N·m$^{-4}$·s.

The resistance to air flow of the upper resistance layer 20 is advantageously between 500 N·m$^{-3}$·s and 1500 N·m$^{-3}$·s, in particular between 900 N·m$^{-3}$·s and 1000 N·m$^{-3}$·s

What is claimed is:

1. A soundproofing assembly for an automobile, of the type comprising:
    a base spring layer made of a porous, resilient material, the base spring layer being configured to be placed opposite a surface of an automobile;
    a stiffening layer arranged above the base spring layer with a surface density of more than 250 g/m²;
    at least one porous, resilient upper layer arranged on the stiffening layer;
    wherein the stiffening layer is made with a base of a dense porous material having a resistance to air flow is strictly higher than 2500 N·m$^{-3}$·s and lower than 6000 N·m$^{-3}$·s.

2. The assembly according to claim 1, wherein a thickness of the stiffening layer is strictly smaller than a thickness of the resilient porous upper layer and strictly smaller than a thickness of the base spring layer.

3. The assembly according to claim 1, wherein the porous material of the stiffening layer comprises a compressed felt, or a layer of recycled material.

4. The assembly according to claim 1, wherein a resistivity to the passage of air of the resilient porous upper layer is advantageously between 10000 N·m$^{-4}$·s and 140000N·m$^{-4}$·s.

5. The assembly according to claim 1, wherein the stiffening layer is applied on the base spring layer, without insertion of a film, the resilient porous upper layer being applied on the stiffening layer without insertion of a film.

6. The assembly according to claim 1, wherein it further comprises at least one airtight film, having a thickness smaller than or equal to 150 μm, inserted between the stiffening layer and one and/or the other of the porous upper layer and the base spring layer.

7. The assembly according claim 1, wherein it also comprises a resistive upper layer, arranged above the porous resilient upper layer, the upper resistive layer having a resistance to air flow between 200 N·m$^{-3}$·s and 2000 N·m$^{-3}$·s.

8. The assembly according to claim 7, wherein the upper resistive layer is made with a base of a nonwoven or a compressed felt having a basis weight of less than 200 g·m$^{-2}$.

9. The assembly according to claim 7, wherein it further comprises a decorative layer or a protective layer arranged on the upper resistive layer, opposite the stiffening layer.

10. The assembly according to claim 1, wherein it further comprises a decorative layer or a protective layer applied on the resilient porous upper layer, opposite the stiffening layer.

11. The assembly according to claim 1, wherein it further comprises a light sealing film, with a basis weight of less than or equal to 150 $g \cdot m^{-2}$ arranged above the resilient porous upper layer and a decorative layer or protective layer applied on the light sealing film, opposite the resilient porous upper layer.

12. The assembly according to claim 1, wherein the base spring layer, and the resilient porous upper layer are made with a felt base.

13. The assembly according to claim 1, wherein the resilient porous upper layer is made with a foam base with a tortuosity greater than 1.4.

14. The assembly according to claim 1, wherein in at least one part of the soundproofing assembly, the base spring layer is spaced apart from the stiffening layer to delimit an air blade with an average thickness greater than the average thickness of the stiffening layer.

15. An automobile wall element comprising:
a support forming a body element of the automobile delimiting a surface; and
an assembly according to claim 1, at least part of the base spring layer of the assembly being arranged spaced away from the support to delimit, between the support and the base spring layer, an air blade with an average thickness greater than the average thickness of the stiffening layer.

16. The assembly according to claim 1, wherein said resistance to air flow is between 3000 $N \cdot m^{-3} \cdot s$ and 5000 $N \cdot m^{-3} \cdot s$.

17. The automobile wall element according to claim 15, wherein said wall element is used in an automobile floor, fire wall or wheel passage.

\* \* \* \* \*